United States Patent Office 2,975,644
Patented Mar. 21, 1961

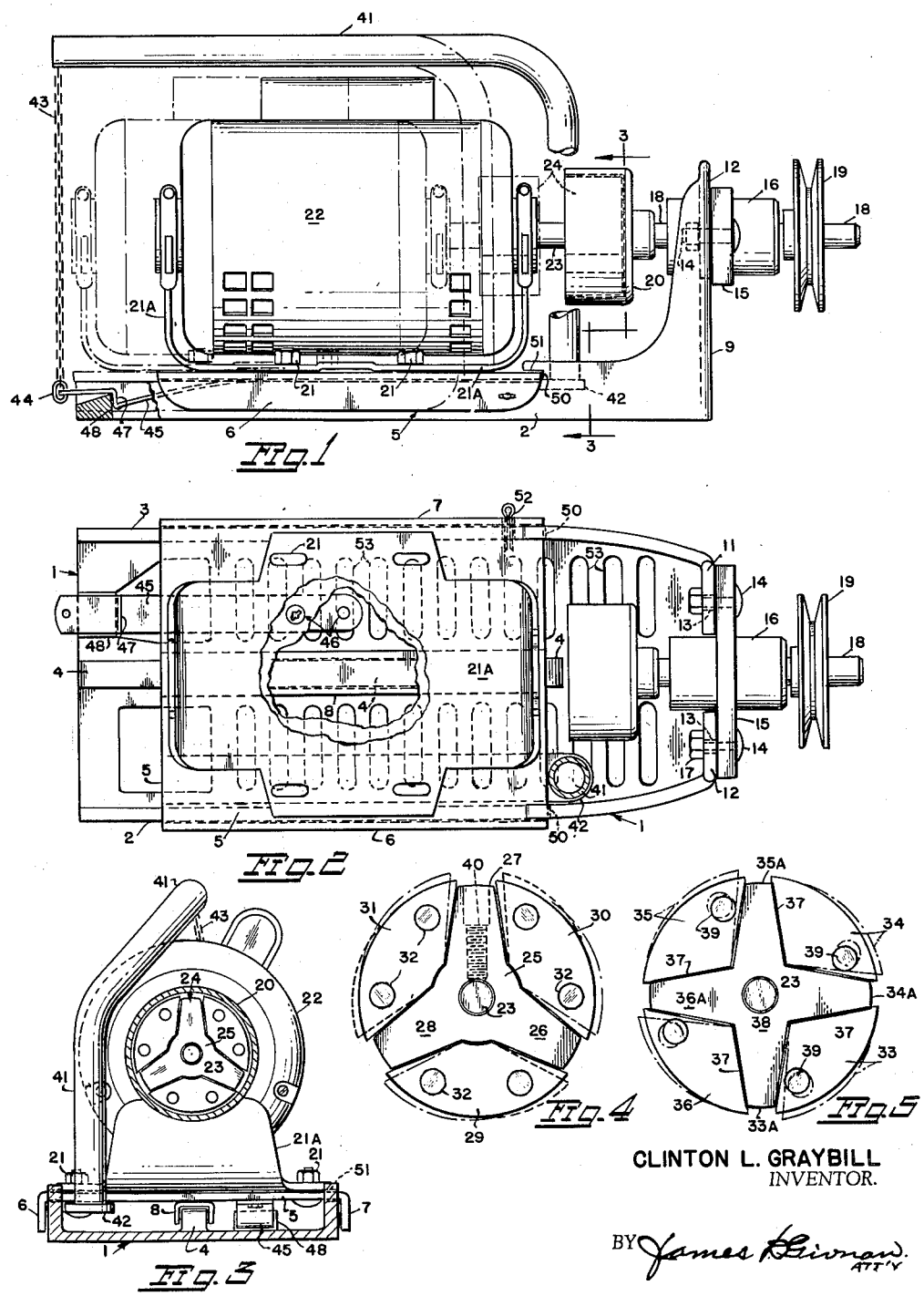

2,975,644

PORTABLE MOTOR AND SEPARABLE POWER TAKE-OFF COUPLING THEREFOR

Clinton L. Graybill, Superior, Mont., assignor to Graybill Industries, Inc., Spokane, Wash., a corporation of Montana Filed Nov. 12, 1957, Ser. No. 695,794

1 Claim. (Cl. 74—16)

This invention relates to power transmission means characterized by a portable prime mover such as an electric motor or an internal combustion engine provided with one clutch element adapted for "plug in" engagement with a cooperating clutch element carried by a permanently mounted pulley base.

One of the principal objects of the invention is the provision of a separate pulley base of the character described for each power tool in a shop and means provided on each pulley base cooperating with the base of a single prime mover for guiding and locking the prime mover upon the pulley base and said clutch elements into self-aligning positive and non-slipping driving engagement with each other. By this arrangement one prime mover equipped in accordance with my invention can selectively service any number of power tools equipped with identical pulley bases according to the invention by merely switching the motor from one pulley base to another.

Another object of the invention is the provision of a combination of the character described whereby the single prime mover can be placed on the pulley base and locked in operative engagement therewith without the use of nuts or bolts, and wherein the drive shaft of the prime mover and its clutch element will automatically align themselves with the pulley shaft and its clutch element carried by the pulley base. Since only one prime mover is needed in accordance with my invention to service all the power tools in a shop, only one tool can be operated at a time, thereby preventing any accidents which might occur by unintentional operation of any of the other tools.

Another feature of the invention is that the pulley base and hence the prime mover can be mounted in any position ranging from horizontal to vertical longitudinally or transversely and in any such position all thrust will be absorbed by the pulley shaft and not by the bearings of the prime mover thus saving the cost of expensive replacements.

The foregoing and other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side elevational view of the invention showing a motor and both clutch elements in an operative position in full lines and in an inoperative position in broken lines.

Figure 2 is a top plan view of Figure 1 with the motor and its clutch element removed.

Figure 3 is a sectional end view taken approximately along the line 3—3 of Figure 1.

Figure 4 is a detail end view on an enlarged scale of the clutch element shown in Figure 3.

Figure 5 is a view similar to Figure 4 showing a modified form of clutch element.

With continuing reference to the drawing, wherein like reference numerals designate corresponding parts, reference numeral 1 indicates generally a main or pulley base vertically flanged as at 2 and 3 along both of its sides and provided with a longitudinal central guide rail 4. Slidably mounted upon the pulley base 1 is an auxiliary base 5 having downwardly extending flanges 6 and 7 along both of its sides to slidably embrace the flanges 2 and 3 of the pulley base 1 and adapted to support a prime mover such as an electric motor or an internal combustion engine. Secured to the underside of the auxiliary base 5 and extending lengthwise thereof is a downwardly opening channel 8 slidably embracing the rail 4.

Cast integral with the pulley base 1 is a vertical end wall 9 recessed downwardly to provide spaced apart vertical members 11 and 12 which are vertically slotted as at 13 to receive bolts 14 extending through a bearing plate 15 by means of which a bearing 16 may be adjusted vertically relative to the end wall 9 and locked thereto by nuts 17 on the bolts 14. Journalled in the bearing 16 is a pulley shaft 18 provided with a pulley 19 at its outer end and with a first clutch element in the form of a hollow cup-shaped member 20 at its inner or opposite end.

Adjustably secured as at 21 to the auxiliary base 5 by means of its cradle 21A is an electric motor 22 adapted to be connected to a source of electrical energy through electrical conductors not shown. To one end of the motor shaft 23 I secure a second clutch element indicated generally at 24, and comprising (see Figures 3 and 4) a hub 25 integrated with three radiating arms 26, 27 and 28. Bonded to the hub portions between said arms are three resilient segmental clutch shoes 29, 30 and 31 preferably made of Neoprene or the like and each provided with a pair of weights 32 in the form of lead lugs extending transversely therethrough. In a static condition the sides of the segments normally rest against the adjacent sides of their respective arms of the hub, but when put into rotary motion by the motor shaft the resultant centrifugal force acting upon the weights 32 will cause the segments to flex radially outward into engagement with the inside peripheral wall of the first clutch element when disposed therein, the degree of firmness of this engagement being, of course, determined by the torque of the motor shaft. From the foregoing it will be apparent that the operation of the clutch elements will be equally effective in either direction of rotation of the motor shaft.

In the modified form of second clutch element shown in Figure 5 I provide four segments indicated at 33, 34, 35 and 36 each bonded only along one of its sides, as at 37, to the adjacent side of one of its respective arms 33A, 34A, 35A and 36A of the hub 38. Each segment is provided with a single lead weight 39 disposed transversely therein at the side opposite to the bonded side whereby upon rotation in a clockwise direction as viewed in Figure 5 the weighted free end of each segment will flex radially outward as indicated in broken lines into wedged engagement with the inside peripheral wall of the first clutch element for driving the same in one direction of rotation only in the manner of an overrunning clutch. Such engagement establishes a positive non-slip coupling as long as the torque is applied to the motor shaft regardless of its speed of rotation. Each second clutch element is removably secured to the motor shaft 23 by a conventional set screw 40 and therefore reversible if necessary because of wear. The form shown in Figure 4 is operative in both directions of rotation before or after reversal while the form shown in Figure 5 if reversed will operate effectively only in a counter-clockwise direction. The segments in both forms of the invention normally define a diameter less than the inside diameter of the cup-shaped member 20 and their flexibility is such that they will expand into locked engagement with the driven clutch element and will maintain such engagement as long as the motor continues to operate. This engagement will effectively hold the motor upon its base against longitudinal displacement, as will the channel 8 and rail 4 hold it against lateral displacement.

For convenience in carrying the motor from one pulley base to another and for manipulating it relative to the pulley base into a "clutch-in" or a "clutch-out" position I provide a handle 41 secured at its downwardly turned forward end to a bar 42 secured to the underside of the auxiliary base 5. The opposite end of the handle terminates rearward of the motor and to this end is attached one end of a pull chain 43 whose opposite end is attached as at 44 to the free end of a latch 45 secured at its opposite end as at 46 to the underside of the auxiliary base 5. The arm is shaped into a detent 47 near its free end for engagement with a vertical abutment 48 on the pulley base 1 for locking the motor in a "clutch-in" position. To release the motor and base for withdrawal from this position it is merely necessary to press rearwardly on the pull chain 43 with one finger of the hand in the act of gripping the handle 41 preparatory to removing the motor and auxiliary base from the pulley base. For locating the second clutch element in its most efficient operative relationship to the first I provide a limit stop 50 for the forward movement of the auxiliary base 5 by undercutting as at 51 the top edge of the flanges 2 and 3 of the pulley base 1.

In addition to the detent 47 for holding the motor in a "clutch-in" position especially when mounted upon a vertically disposed pulley base I provide a cotter pin 52 adapted to be inserted through aligned apertures in the flanges 3 and 7 and/or 2 and 6 respectively of the motor base 5 and main base 1.

While I have shown particular forms of embodiment of my invention I am aware that many minor changes therein will readily suggest themselves to others skilled in the art without departing from the spirit and scope of the invention. Having thus described my invention what I claim as new and desire to protect by Letters Patent is:

A device of the class described comprising an elongated substantially rectangular flat base, a guide rail secured to the top of said base and extending lengthwise thereof, a horizontal bearing vertically adjustable and lockable relative to one end of the base, a power take-off shaft journalled in said bearing, a hollow cup-shaped first clutch element having an inner wall secured to one end of said shaft, an auxiliary base having a downwardly opening channel member extending lengthwise thereof and slidably engaged with said rail, said auxiliary base adapted to support prime movers whose shaft centers vary in height from said auxiliary base whereby said horizontal bearing can be adjusted vertically relative to the main base into selective alignment with said shafts of prime movers and locked relative to the main base, a second clutch element comprising a core provided with radiating arms and adapted for securement to said shafts of prime movers, resilient segments carried by the core disposed between said arms and of a greater radial extent than said arms and adapted for insertion within said first clutch element whereby upon rotation of said second clutch element said segments will flex radially outward by centrifugal force into wedged driving engagement with said first clutch element and whereby such engagement will hold a motor, to whose shaft said second clutch element is secured, in position upon said main base against longitudinal displacement and whereby said rail and channel member will hold said motor against lateral displacement.

References Cited in the file of this patent

UNITED STATES PATENTS

| | | |
|---|---|---|
| 1,803,402 | Napier | May 5, 1931 |
| 2,097,729 | Mall | Nov. 2, 1937 |
| 2,209,774 | Huebsch | July 30, 1940 |
| 2,543,873 | Scruby | Mar 6, 1951 |
| 2,565,473 | Cline | Aug. 28, 1951 |
| 2,753,967 | Bowers | July 10, 1956 |

FOREIGN PATENTS

| | | |
|---|---|---|
| 208,863 | Great Britain | Jan. 3, 1924 |
| 621,828 | France | Feb. 14, 1927 |
| 348,823 | Italy | July 1, 1937 |
| 856,541 | France | Mar. 23, 1940 |